(12) United States Patent
Tanabe et al.

(10) Patent No.: US 7,447,363 B2
(45) Date of Patent: Nov. 4, 2008

(54) IMAGE PROCESSING SYSTEM WITH PARALLEL INPUT AND RESTART MARKER

(75) Inventors: Tomoya Tanabe, Kanazawa (JP); Nobuhisa Yamazaki, Tsubata-machi (JP); Yasushi Takemura, Tsubata-machi (JP); Kunihiko Oumi, Kanazawa (JP); Shougou Maki, Kahoku (JP); Satoshi Kubo, Tsubata-machi (JP); Ikuo Murata, Nonoichi-machi (JP); Yukio Kaji, Kanazawa (JP)

(73) Assignee: PFU Limited, Ishikawa (JP)

( * ) Notice: Subject to any disclaimer, the term of this patent is extended or adjusted under 35 U.S.C. 154(b) by 568 days.

(21) Appl. No.: 10/511,312

(22) PCT Filed: Apr. 28, 2003

(86) PCT No.: PCT/JP03/05429

§ 371 (c)(1),
(2), (4) Date: Oct. 15, 2004

(87) PCT Pub. No.: WO03/094503

PCT Pub. Date: Nov. 13, 2003

(65) Prior Publication Data

US 2005/0157934 A1    Jul. 21, 2005

(30) Foreign Application Priority Data

Apr. 30, 2002    (JP) ............................. 2002-128206

(51) Int. Cl.
*G06K 9/36* (2006.01)

(52) U.S. Cl. .................................................. 382/232
(58) Field of Classification Search ................ 382/232; 345/555; 358/426.01–426.16
See application file for complete search history.

(56) References Cited

U.S. PATENT DOCUMENTS

| | | | | |
|---|---|---|---|---|
| 5,848,192 | A * | 12/1998 | Smith et al. | 382/232 |
| 6,344,906 | B1 * | 2/2002 | Gatto et al. | 358/443 |
| 6,362,870 | B2 * | 3/2002 | Mui et al. | 355/24 |
| 6,549,663 | B1 * | 4/2003 | Yokose et al. | 382/232 |

FOREIGN PATENT DOCUMENTS

| | | |
|---|---|---|
| JP | 11-313210 | 11/1999 |
| JP | 2000-261641 | 9/2000 |
| JP | 2001-218064 | 8/2001 |

OTHER PUBLICATIONS

Search Report, mailed on Aug. 11, 2006, for a corresponding Japanese Patent Application.

* cited by examiner

*Primary Examiner*—Vikkram Bali
*Assistant Examiner*—Eueng-Nan Yeh

(57) ABSTRACT

After reading a predetermined number of predetermined blocks for each of a plurality of image data, a first image read unit 13 reads out the plurality of image data read in parallel by repeatedly switching the designated order of the plurality of image data. A JPEG compression unit 14 performs image compression on the plurality of image data read out in block units by the first image read unit 13, image-compresses a predetermined number of the blocks for each of the plurality of image data, and then inserts an identifier after the last block of the predetermined number of blocks.

6 Claims, 7 Drawing Sheets

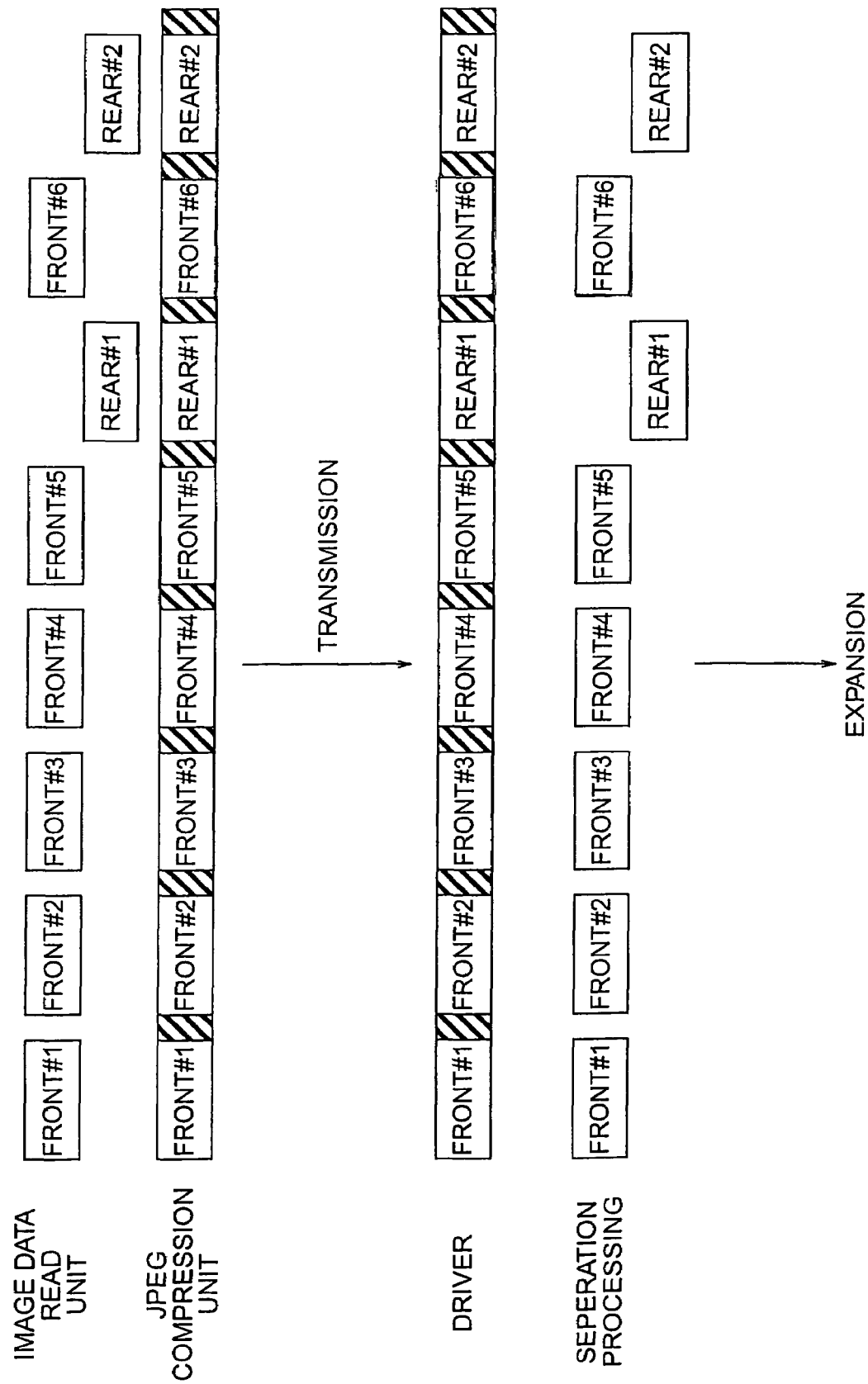

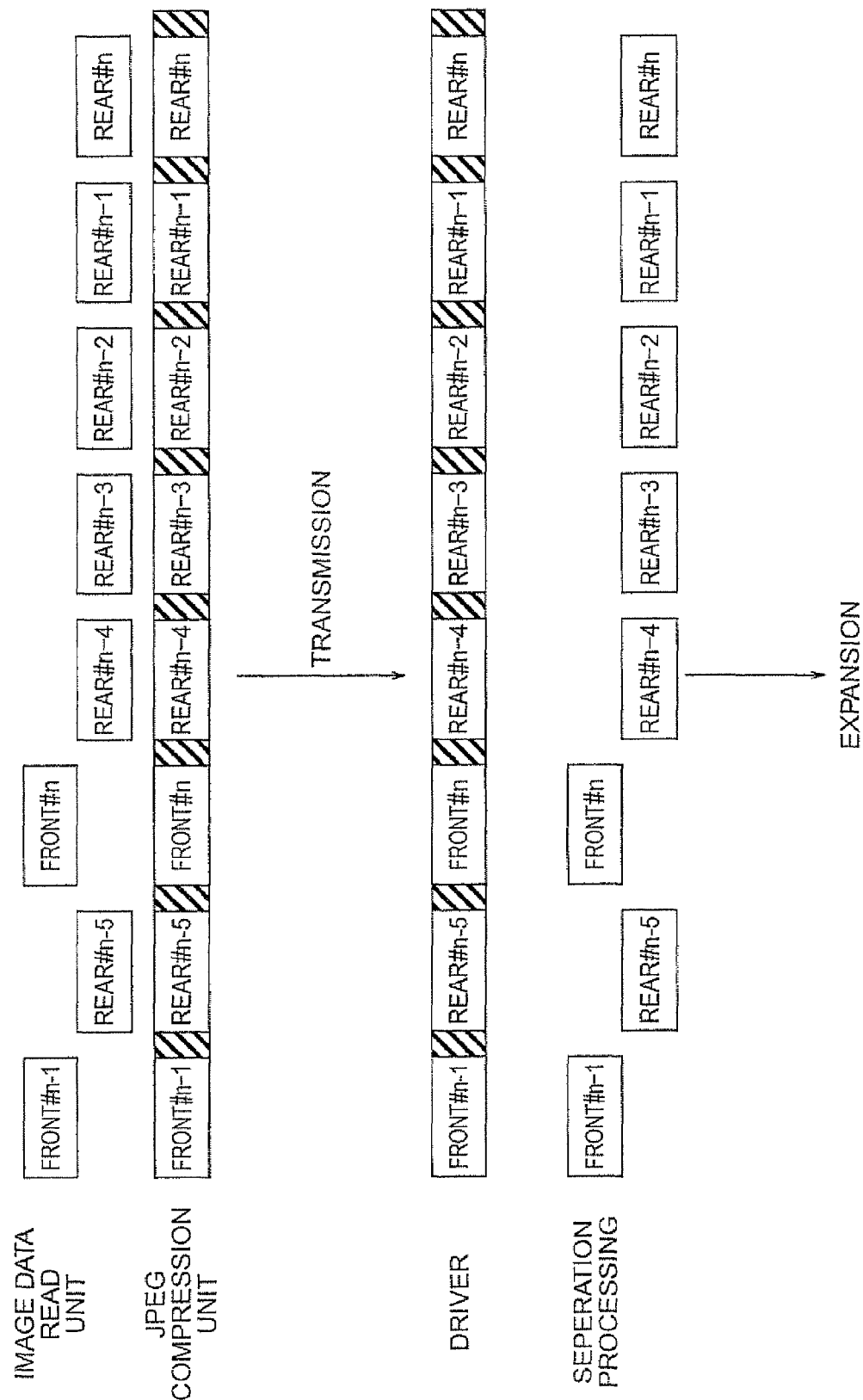

IMAGE PROCESSING SYSTEM WITH PARALLEL INPUT AND RESTART MARKER

TECHNICAL FIELD

This invention relates to an apparatus and method for image processing, and more particularly relates to an apparatus and method for image processing to carry out compression processing such as JPEG, etc. by switching over between image data of a plurality of systems read out concurrently.

BACKGROUND ART

For example, transfer of full color image data over an Internet is normally carried out by transferring JPEG (Joint Photographic Experts Group) format image files. It is necessary to carry out data compression processing (hereinafter referred to as JPEG compression processing) to give JPEG format image data for the image date in order to convert image data read from an original document into JPEG format image data (an image file).

As is well-known, broadly speaking, in JPEG compression processing, after image data for a source (original image data) is stored temporarily in image memory, the original image data is read out and is divided into a plurality of 8×8 pixel blocks. DCT (Discrete Cosine Transforms) and quantization are then carried out on each block, followed by scan transformation and Huffman coding.

With image reading apparatuses such as scanners etc., there are also cases where both the "front" and "back" of a single original document are read concurrently (or at substantially the same time). In this case, image data read in concurrently and inputted to image memory (or an image processing unit) exists for the two systems of the front and rear. When image data input then exists for two systems (or more), the following problems occur with respect to this JPEG compression processing.

It is normally necessary to provide a number of arithmetic circuits for carrying out processing corresponding to the number of systems inputted in order to perform JPEG compression processing on image data inputted for the two systems. In this case, the scale of the circuitry for carrying out this image compression processing becomes extremely large simply for carrying out JPEG compression processing and this invites increases in cost. This problem becomes ever more significant for three systems or more.

Further, even when the inputted image data is for two systems, there are cases where this data is subjected to JPEG compression processing using one arithmetic circuit. In this case, when JPEG compression processing is carried out on image data of the first system, it is necessary to store all of the image data of the second system which is currently not being subjected to image compression processing in image memory. Image memory of an extremely large capacity is therefore required and this invites increases in costs. Further, during the JPEG compression processing, inputted image data that is image data for the first system is processed by the arithmetic circuit via image memory and image data for the second system is read out from image memory and processed by the arithmetic circuit. The processing time required for JPEG compression processing is therefore extremely large which brings about a lowering of the processing performance. This problem also becomes ever more significant for three systems or more.

It is an object of the present invention to provide an image processing apparatus for carrying out image processing on image data read concurrently for a plurality of systems using a small amount of image memory and in an efficient manner.

It is another object of the present invention to provide an image processing apparatus for expanding image data which is read concurrently for a plurality of systems and is compressed after dividing the image data.

It is still another object of the present invention to provide an image processing apparatus for carrying out image processing on image data read concurrently for a plurality of systems using a small amount of image memory and in an efficient manner, and for expanding image data which is read concurrently for a plurality of different systems and is compressed after dividing the image data.

DISCLOSURE OF INVENTION

The image processing apparatus of the present invention comprises an image memory to store a plurality of image data read in parallel, an image read unit to read out the plurality of image data from the image memory in block units of a predetermined size, and an image compression unit to carry out compression processing on the plurality of image data read out by the image read unit. The image read unit reads out the plurality of image data read in parallel by repeatedly reading a predetermined number of predetermined blocks for each of the plurality of image data and switching the plurality of image data according to a designated order after the reading. The image compression unit inserts an identifier after the final block of the predetermined number of blocks after image compression the predetermined number of blocks for each of the plurality of image data by image compression in block units the plurality of image data read out by the image read unit.

According to the image processing apparatus of the present invention, every time a predetermined number of blocks of a plurality of image data read-out in parallel are read out, reading out takes place of the plurality of image data switching in a designated order, and the image is compressed. As a result, a plurality of image data can be compressed with a single image compression processor and the possibility of circuit scale becoming substantial for image compression processing just to perform JPEG compression processing thus inviting cost increases is avoided. Further, it is not necessary for all image data that is not to be subjected to image compression processing within the plurality of image data to be stored in the image memory, a large capacity image memory is therefore not required, and cost increases are avoided. Moreover, during image compression processing, each of the plurality of image data passes through the image memory and is subjected to image compression processing at the image compression processor. The processing time required for the image compression processing therefore does not have to be made long and reduction in processing performance can be avoided.

The image processing apparatus of the present invention comprises an image processing control unit to receive an image file storing image-compressed image data, and an image expansion unit to expand the image-compressed image data. The image-compressed image data comprises a plurality of image data read in parallel, and each of the plurality of image data includes predetermined numbers of blocks of a predetermined size which are image-compressed in units of the blocks and an identifier inserted after the last block of the predetermined numbers of blocks, and the plurality of image data is arranged so as to switch over between the plurality of image data according to a designated order. The image processing control unit separates the image-compressed image data each of the plurality of image data according to the identifiers included in the image-compressed image data and sends the separated plurality of image data to the image expansion unit. The image expansion unit expands each of the separated plurality of image data in units of the blocks.

According to the image processing apparatus of the present invention, at the image processing apparatus, image-compressed image data is data where a plurality of image data read out in parallel image-compressed every predetermined number of blocks and an identifier is inserted. In this way, it is possible to separate a plurality of image data from the image-compressed image data in accordance with the identifiers without performing expansion. The time required for processing image-compressed image data can therefore be made shorter rather than expanding and then separating the data and reductions in processing performance can be avoided.

An image processing method of the present invention comprises storing a plurality of image data read in parallel, reading out the plurality of image data read in parallel by repeatedly reading a predetermined number of predetermined blocks for each of the plurality of image data and switching the plurality of image data according to a designated order after the reading, inserting an identifier after the final block of the predetermined number of blocks after image compression the predetermined number of blocks for each of the plurality of image data by image compression in block units the plurality of image data read out, receiving an image file storing the image-compressed image data, separating the image-compressed image data each of the plurality of image data according to the identifiers included in the image-compressed image data, and expanding each of the separated plurality of data in units of the blocks.

According to the image processing method of the present invention, with this image processing method, a plurality of items of image data read out in parallel are read-out and image-compressed by switching the plurality of image data in a designated order every time a predetermined number of blocks is read-out, and identifiers are inserted. In this way, as described above, it is possible to image-compress a plurality of image data using a single image compression processor. It is therefore possible to store all image data within the plurality of image data that is not subjected to image compression processing can be stored in the image memory. It is therefore possible for each of a plurality of image data to be passed through the image memory and be subjected to image compression processing by the image compression processor during image compression processing. Increases in circuit scale and image memory size in order to perform image compression processing can therefore be avoided and processing time taken up by the image compression processing can be prevented from becoming long. Further, it is possible to separate a plurality of image data from the image-compressed image data in accordance with the identifiers. The time required for processing image-compressed image data can therefore be made shorter as a result of expanding and then separating the data.

BRIEF DESCRIPTION OF DRAWINGS

FIG. 1 is a view illustrating an image processing system, where

FIG. 5 is a view illustrating a host computer, where

FIG. 6 is a view illustrating image processing.

FIG. 7 is a view illustrating image processing.

BEST MODE FOR CARRYING OUT THE INVENTION

Figure 1A:
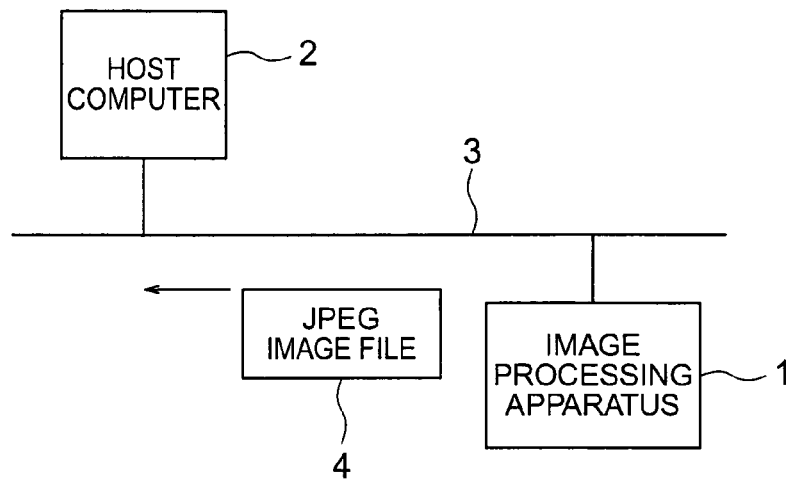
FIG. 1A shows a structure for an image processing system including an image processing apparatus of the present invention and FIG. 1B shows image processing occurring in the image processing system of FIG. 1A.

FIG. 1A is a view of a structure for an image processing system, and shows an image processing system including an image processing apparatus of the present invention.

As shown in FIG. 1A, an image processing system of the present invention comprises a scanner 1 constituting an image processing apparatus of the present invention, a host computer 2 constituting an image processing apparatus of the present invention, and an interface 3 connecting between the scanner 1 and host computer 2. In addition, the scanner 1 may also be an image reading apparatus such as a photocopy machine or a facsimile device. The host computer 2 may also be, for example, a server, an image reading apparatus such as a photocopy machine, or a facsimile device. The scanner 1 makes a JPEG image file 4 based on a plurality of image data concurrently read and transfers them to the host computer 2 via the interface 3. The interface 3 may be a network such as, for example, a LAN (Local Area Network), WAN (Wide Area Network) or network such as the Internet. The host computer 2 divides the received JPEG image file 4 up for each of the plurality of image data, and expands the each. Namely, the host computer 2 is also an image processing apparatus.

Figure 2:
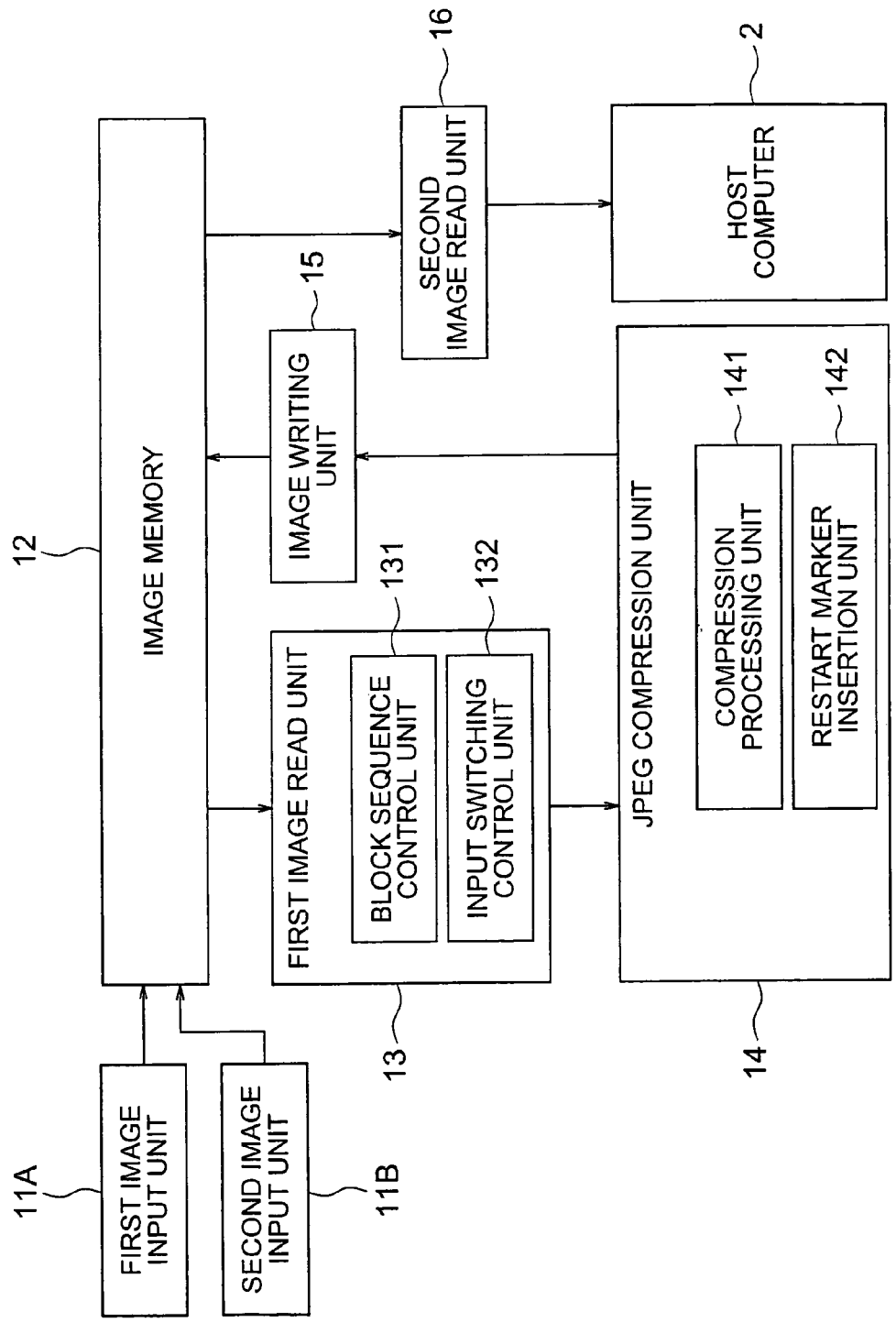
FIG. 2 is a view of a structure for a scanner constituting an image processing apparatus of the present invention.

FIG. 2 is a view of a structure for an image processing apparatus, and shows a structure for a scanner 1 constituting an image processing apparatus of the present invention. In this example, the scanner 1 is equipped with first and second image input units 11A and 11B for concurrently (at substantially the same time) reading in two items of image data, single image memory 12, a first image read unit 13, single JPEG compression unit 14, an image writing unit 15, and a second image read unit 16. The first image read unit 13 is provided with a block sequence control unit 131 and an input switching control unit 132. The JPEG compression unit 14 comprises a compression processing unit 141 and a restart marker insertion unit 142.

The first and second input units 11A and 11B comprise image readers 111A and 111B (refer to FIG. 3A) constituted by CCDs, analog/digital converters and image processors (neither of which are shown), acquire image data through well-known image processing, and store the acquired image data in the image memory 12. Namely, the first and second image input units 11A and 11B carry out various correction processing on image data (digital signal) obtained by converting image data read by the image readers 111A and 111B to a digital signal, carry out binarizing etc. if necessary, carry out optimization processing to form image data, and store the formed image data is stored in the image memory 12.

Figure 1B:
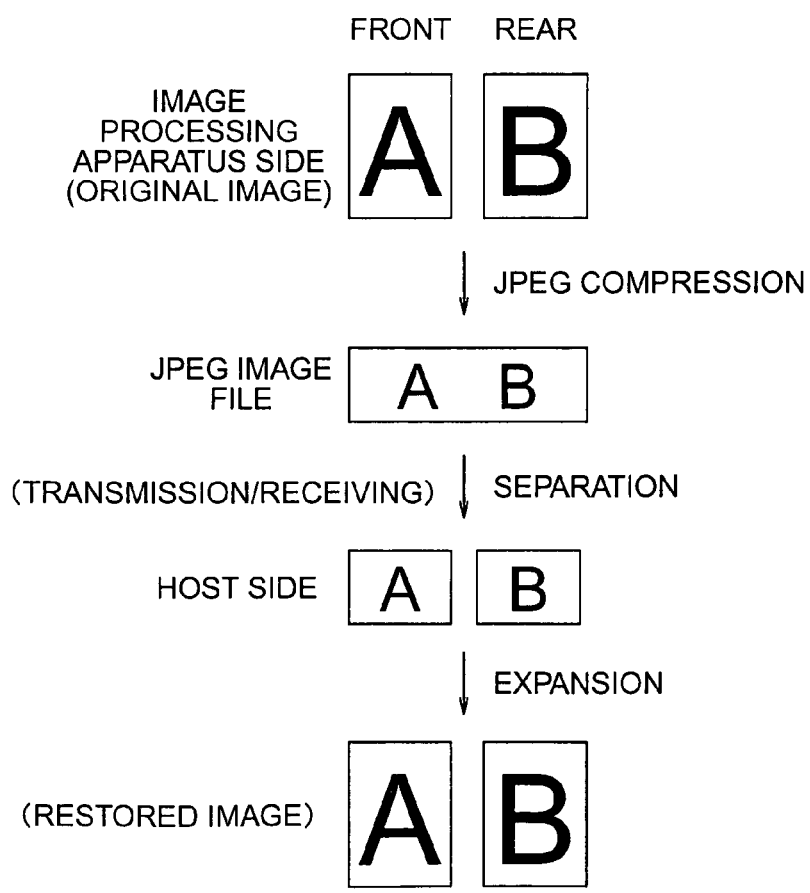
Figure 3A:
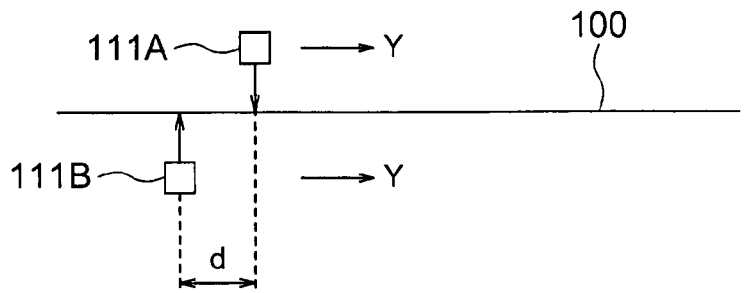
FIG. 3A to FIG. 3D are views illustrating image processing.

In this example, there are provided image input units 11A and 11B for two systems for reading in front side and reverse side images for the original document. There exist therefore two image data which is read concurrently and is inputted to single image memory 12 and single JPEG compression unit 14. In this example, as shown in FIG. 1B, the first image input unit 11A, for example, reads an image A for the front surface of an original document 100 using the image reader 111A, and, as shown in FIG. 3A, writes this image data (front surface image data) A to the image memory 12. As shown in FIG. 1B, the second image input unit 11B reads an image B for the rear surface of the original document 100 using the image reader 111B and writes this image data (rear surface image data) B to the image memory 12. Therefore, in this example, the image memory 12 stores the image data A and B concurrently read for two systems.

As shown in FIG. 3A, the image readers 111A and 111B are positioned in a sub-scanning direction (the direction of the arrow Y) spaced from each other by a distance d (for example, approximately 1 cm). When both of the image readers 111A and 111B are provided at the same position in the sub-scanning direction Y, light from light sources for both of the image readers 111A and 111B passes through the source document 100 and accurate image data cannot be acquired. The vertical positional relationship of the image readers 111A and 111B is the opposite of the case shown in FIG. 3A. This example shows where code A is assigned to the image reader 111 advancing in the sub-scanning direction Y, and takes the image input unit 11 equipped with the image reader 111A as a first image input unit 11A and the surface read by the first image input unit 11A as the front surface (this may also be reversed).

Figure 4:
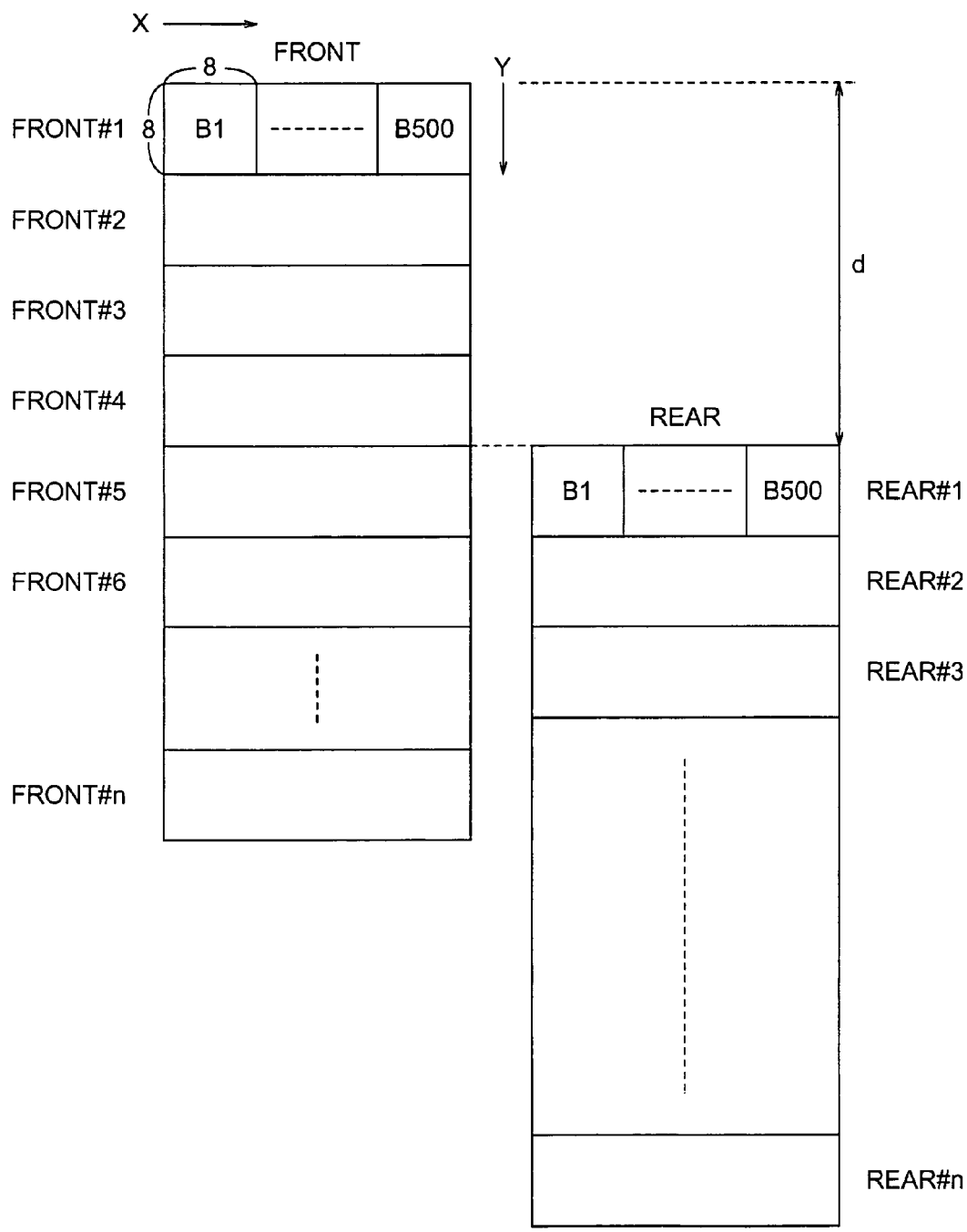
FIG. 4 is a view illustrating image processing.

As is well-known, JPEG compression processing divides the image data up into blocks of 8×8 pixels and carries out JPEG compression on each block. The adaptation of this to the original document 100 and image memory 12 in this example is shown in FIG. 4.

Single image data in this example comprises image data for one page. The two page portion of image data for the front page and rear page is therefore read-in concurrently. One page portion of image data includes, for example, 500 JPEG (8×8) blocks provided in a main scanning direction X (although there are more in reality), and n (for example, a few thousand) JPEG blocks provided in the sub-scanning direction Y. The rows of blocks in the main scanning direction X are shown in order from the top by assigning numbers B1 to B500. In order to keep the drawings simple, the distance d is taken to be a distance corresponding to, for example, four blocks, i.e. 32 pixels (although in reality this is approximately 1 cm and the number of pixels is correspondingly larger). The rows of blocks occurring in the main scanning direction X are given numbers "#1 to #n" in order to distinguish the order and also given distinction of the front and reverse, so as to be expressed as, for example, "front #1". Therefore, in this case, one block row "front #1" comprises blocks B1 to B500 in order from the top, and one item of image data, i.e. one page portion of image data comprises n block rows "front #1" to "front #n" or "rear #1" to "rear #n" in order from the top. x Regarding this reading, with respect to one page of image data, one row (pixel row) of data is read in the main scanning direction X in order from the top by the image readers 111A and 111B, with this being repeated for each pixel row in the sub-scanning direction Y Then, regarding the read image data, one pixel row of image data (one row or a plurality of rows) is written as is in the direction X at the image memory 12 by the image input units 11A and 11B, with this being repeated for the direction Y.

Figure 3B:
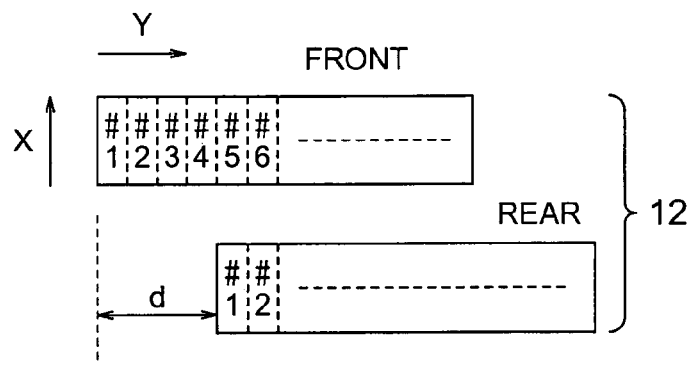
Figure 3C:
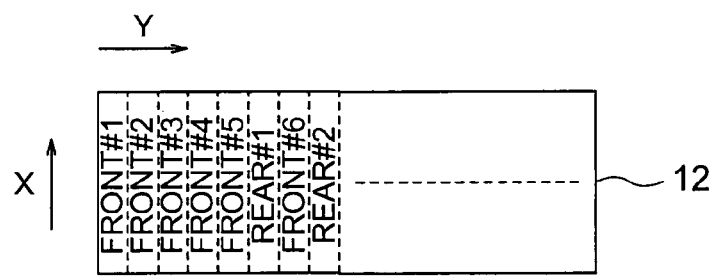

Next, as shown in FIG. 3B, in the sub-scanning direction Y, block rows "front #1" to "front #4" corresponding to the distance d at the rear surface are read-out in advance at the front surface of the original document 100, with image data for block rows "front #5" of the front surface onwards and block rows rear #1 of the rear surface onwards being read out in parallel, and with block rows "rear #(n-3)" to "rear #n" corresponding to the distance d being read out last, with this image data being written to the image memory 12 in this order. However, in reality, there is one image memory 12, and as shown in FIG. 3C, block rows "front #1" to "front #4" read out in advance are written in order from the top of the image memory 12, and next, block rows "front #5", "rear #1", "front #6", and "rear #2" onwards are written alternately, with block rows "rear #(n-3)" to "rear #n" written last, by the image input units 11A and 11B.

On the other hand, regarding reading out form image memory, it is necessary to read out image data from the image memory 12 in block units in order to carry out JPEG compression at the JPEG compression unit 14. However, regarding one page of image data, data for one pixel row in the main scanning direction X is read out from the image memory 12 one at a time in order from the top, with this being repeated for each pixel row in the sub-scanning direction Y. At the first image read unit 13, the read-out image data is put into a format capable of undergoing JPEG compression as described below for inputting to the JPEG compression unit 14.

The first image read unit 13 then reads out image data from the image memory 12, and the block sequence control unit 131 makes two items (front and rear) of image data in block units of a predetermined size from the image memory 12, when this data is inputted to the JPEG compression unit 14. The size of the blocks is taken to be 8 pixels×8 pixels so as to enable JPEG compression. In reality, the block sequence control unit 131 reads out and holds eight pixel rows one pixel row at a time from the top position of reading at this time, reads out eight pixels from the top for each pixel row of this eight rows, and repeats this for one block. Block size can be changed. For example, block size may be 16×16, or 16×8, etc.

After reading out just a predetermined number of these predetermined blocks for the two items of image data A and B, the first image read unit 13 switches over between the plurality of image data in a designated order using the input switching control unit 132. As described above, the targets of reading are each one page of image data, with the predetermined number corresponding to the width in the main scanning direction X of the page. Therefore, in this example, this is 500. This predetermined number can be changed. For example, when the size of the block is 16×16, then this number can be taken to be 250. Moreover, the predetermined number may be a number other than the width in the main scanning direction X of the page. It is also possible to designate the order of switching of the plurality of items of image data. In this example, the block rows are arranged in the order of "front #1 to front #4", "front #5", "rear #1", "front #6", "rear #2", . . . , "rear #(n-3)" to "rear #n", with switching in this manner being designated.

The first image read unit 13 reads out the two items of image data A and B read out in parallel by repeating the aforementioned operation but starts to read out each of the two items of image data A and B prior to storing all of the data for each item of image data in the image memory 12. For example, when several 100 block rows are stored collectively for the front image data A and the rear image data B, the first image read unit 13 starts to read out from the top. The starting of the reading is decided so that the first image read unit 13 adopts a predetermined timing. As described above, as shown in FIG. 3, the first image read unit 13 reads block rows "front #1" to "front #4", then alternately reads out block row "front #5", "rear #1", "front #6", "rear #2" onwards, and finally reads out block row "rear #(n-3)" to rear #n for inputting to the JPEG compression unit 14. The front image data A and the rear image data B is therefore mixed together and inputted to the JPEG compression unit 14.

Figure 3D:
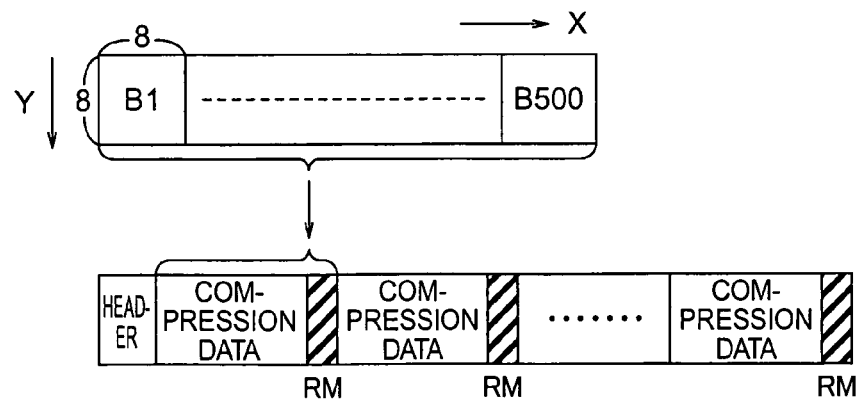

The JPEG compression unit 14 subjects image data inputted by the first image read unit 13 to JPEG compression, inserts a re-start marker, and outputs this to the image writing unit 15. Namely, as shown in FIG. 3D, the JPEG compression unit 14 performs image compression in units of the block B using the compression processing unit 141 on image data for two systems for the front and rear which is read out by the first image read unit 13 in block B units of eight pixels by eight pixels. Namely, DCT (discrete cosine transforms) and quantization is carried out for each block, with scan conversion and Huffman coding also being carried out. Regarding each of the items of image data A and B for the front and rear, the JPEG compression unit 14 subjects the predetermined number of 500 of these blocks B to image compression, and finally inserts a restart marker RM as an identifier after the compressed data of the block B500 using the restart marker insertion unit 142. The restart marker RM is therefore added to the end of the compressed data (or between the following block row) every one block row. In this example, the data is arranged in the order of (compression data for) block row "front #1", RM, "front #2", RM, "front #3", . . . , rear #n, RM. The compression data for the image data A for the front page and the compression data for the image data B for the rear page is therefore mixed up together. A header is attached to the head of the JPEG image file 4.

The image writing unit 15 then writes image data subjected to JPEG compression and outputted by the JPEG compression unit 14 to an empty region of the image memory 12. For example, the block row is written to the region from which the block row was originally read out from.

The second image read unit 16 reads out image data from the image memory 12 and transfers the data to the host computer 2 via the interface 3. This image data is JPEG-compressed image data, i.e., the JPEG image file 4. As shown in FIG. 1B, the JPEG image file 4 is made as one JPEG image file for the front and rear images. Namely, in this case, the second image read unit 16 creates one JPEG image file 4 that integrates the image data A and B. The host computer 2 divides the received single JPEG image file 4 into two image data A and B prior to expanding the JPEG image file 4, and then expands each of the image data A and B to obtain restored image data A and B.

Figure 5A:
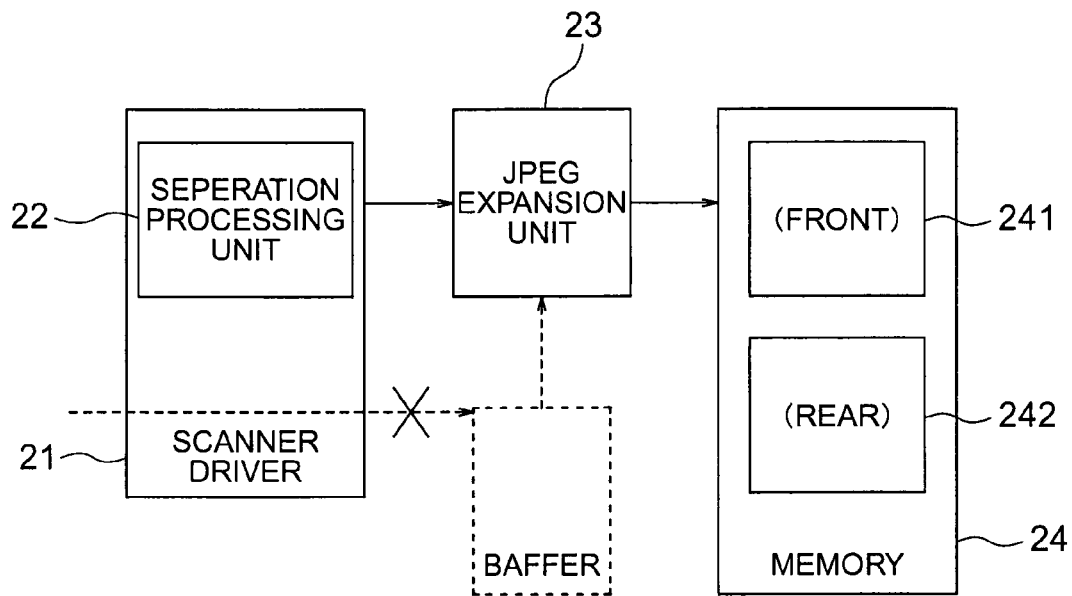
FIG. 5A shows the structure of a host computer constituting an image processing apparatus of the present invention and FIG. 5B shows expansion occurring in this image processing.

FIG. 5A is a view of the structure of the host computer, and shows the structure of the host computer 2 constituting the image processing apparatus of the present invention. In this example, the host computer 2 is equipped with a scanner driver 21, JPEG expansion unit 23, and memory 24. The scanner driver 21 is equipped with a separation processing unit 22.

The scanner driver 21 controls the scanner 1 and carries out communication with the scanner 1 so as to receive a JPEG image file 4 storing JPEG-compressed image data from the scanner 1. The scanner driver 21 passes the received JPEG image file 4 over to the separation processing unit 22.

The separation processing unit 22 detects the restart marker RM in the JPEG image file 4 containing the restart marker RM without expanding the file (prior to expansion) and then separates image data A and B for the front and rear in accordance with this restart marker RM. Therefore, as shown by the dotted line in FIG. 5A, it is not necessary for the host computer 2 to be equipped with a buffer(memory) for inputting the image data received by the scanner driver 21 to the JPEG expansion unit 23. The separation processing unit 22 sends the separated image data to the JPEG expansion unit 23.

Figure 5B:
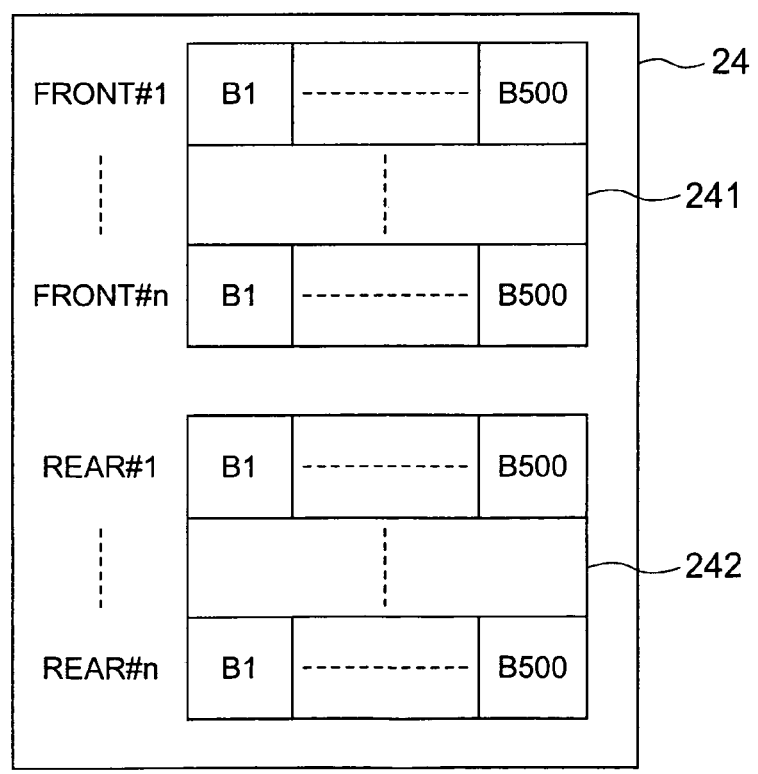

The JPEG expansion unit 23 expands data separated for image-compressed image data of the JPEG image file 4 and stores this in the memory (image memory) 24. The JPEG-compressed image data is expanded in block units. In this way, as shown in FIG. 5B, expanded image data 241 for a front page and expanded image data 242 for a rear page can be obtained.

As described above, the JPEG image file 4 received by the scanner driver 21 contains JPEG-compressed data that is mixed for the two items of image data A and B for the front and rear. However, in reality, according to the present invention, the JPEG file 4 includes a restart marker RM. Therefore, at the separation processing unit 22, processing that is the reverse of processing shown in FIG. 3D is carried out. Namely, the separation processing unit 22 detects the restart marker RM in order from the top of the JPEG image file 4 and separates the compressed data (block rows) into the predetermined image data up to the detected restart marker RM. In this example, as described above, the JPEG image file 4 is constituted by (compression data for) block row "front #1", RM, "front #2", RM, "front #3", . . . , rear #n, RM, in order from the top. When the first restart marker RM is detected, the block rows up to this point are separated as "front #1", the restart marker RM is deleted and the separated data is inputted to the JPEG expansion unit 23. When up to four restart markers RM are detected, these are divided as "front #2", "front #3", and "front #4" and inputted to the JPEG expansion unit 23. When five and six restart markers RM are detected, these are taken as "front #5" and "rear #1", alternately separated into front page image data (for the fifth block row) and rear page image data (for the first block row) and inputted to the JPEG expansion unit 23.

In the conventional art, when JPEG-compressed data for the image data A and B for the front and rear are mixed, it is not possible to determine which portion is front page image data and which portion is rear page image data without expanding the whole of the JPEG image file 4. It is therefore necessary to provide a buffer (memory) for inputting the image data to the JPEG expansion unit 23 and it is necessary for the capacity of the memory to be sufficient to store the whole of the JPEG image file 4.

Further, there are cases where image expansion is completely unnecessary at the host computer 2 during inputting of images from the scanner 1. For example, there are cases such as the inputting of image data for a large volume of pages where filing takes place simply by separating a JPEG image file. In such cases, according to the present invention, it is not necessary to perform expansion processing on the image simply to (only) separate the image and extremely high-speed image processing is therefore possible. In the conventional art, an image cannot be separated without being expanded. It is therefore unavoidable that the image is expanded regardless of it being unnecessary to expand the image when it is only necessary to file the image file.

FIG. 6 and FIG. 7 are views illustrating image processing and show transfer of the JPEG image file 4 from the scanner 1 of the present invention to the host computer 2 and expansion of the received JPEG image file 4 at the host computer 2.

In FIG. 6, the first image read unit 13 of the scanner 1 reads out the two items of image data A and B stored in the image memory 12 in a predetermined order from the block row "front #1" under the control of the input switching control unit 132. At this time, the block sequence control unit 131 reads out image data for blocks B1 to B500 constituting the block row "front #1" in the order of block B1, B2 . . . . and sends the image data to the JPEG compression unit 14. At the time of reading out the image data for the 500 blocks B1 to B500, the input switching control unit 132 switches over the image data to be read out from block row "front #1" to block row "front #2".

At the compression processing unit 141, the JPEG compression unit 14 carries out JPEG compression processing for each block on the image data for the blocks B1 to B500 constituting the inputted block row "front #1" in the order of block B1, B2, . . . . The restart marker insertion unit 142 then adds a restart marker RM (shown by an oblique line here and in the following) after the last block B500. The JPEG-compressed blocks B1 to B500 are then re-written to the image memory 12 together with the restart marker via the image writing unit 15.

The first image read unit 13 (or the block sequence control unit 131 in it) similarly reads out image data for the blocks B1 to B500 constituting the block row "front #2" in accordance with the switching and then switches over reading out of the image data. The JPEG compression unit 14 carries out JPEG compression processing on image data for the blocks B1 to B500 of the block row "front #2", and finally adds a restart marker RM to the end of the image data and writes the image data to the image memory 12. Similarly, in the following, as shown in FIG. 6, each of the block rows are read out in the order of "front #3", "front #4", "front #5", "rear #1", "front #6", "rear #2", . . . JPEG-compressed, and re-written.

As shown in FIG. 7, as the processing similarly advances, each of the block rows are read out in the order of "front #n-1", "rear #n-5", "front #n", "rear #n-4", "rear #n-3", "rear #n-2", "rear #n-1", "rear #n", JPEG-compressed, and re-written. This compressed data is then read-out and sent to the host computer 2 as a single JPEG image file 4.

On the other hand, the scanner driver 21 of the host computer 2 sends the received JPEG image files 4 to the separation processing unit 22 in the order of receipt. When the separation processing unit 22 checks the JPEG image file 4 from the top and detects the restart marker RM, the compression data up to the detected restart marker RM is separated into block row "front #1", the restart marker RM is deleted and the separated data is input to the JPEG expansion unit 23. The JPEG expansion unit 23 expands the separated data as the block row "front #1" (the block row for the top of the image data A for the front page).

After this, when the separation processing unit 22 detects the next restart marker RM, the compression data up to the detected restart marker RM is separated into the block row "front #2", the restart marker RM is deleted, and the separated data is inputted to the JPEG expansion unit 23. The JPEG expansion unit 23 expands the separated data as the block row for "front #2". Similarly, in the following, as shown in FIG. 6, the compressed data is separated and expanded in an order for each of the block rows of "front #3", "front #4", "front #5", "rear #1", "front #6", "rear #2", . . . .

As shown in FIG. 7, as the processing similarly advances, compressed data is separated and expanded for each of the block rows in the order of "front #n-1", "rear #n-5", "front #n", "rear #n-4", "rear #n-3", "rear #n-2", "rear #n-1", "rear #n".

In the above, a description is given according to the preferred embodiments of the present invention but various modifications are possible in accordance with the main points of the present invention.

For example, image data read-out in parallel to be subjected to JPEG compression processing may be for three systems (three items) or more. Further, reading of a plurality of items of image data in parallel does not have to be achieved by providing two (or more) image input units, but can also be achieved by providing one image input unit capable of higher operation speeds than the JPEG compression unit 14 and switching this over. It is also possible to actually read a plurality of items of image data in parallel. Further, the image data may be full color image data, monochrome image data, or binarized image data. Moreover, the present invention is similarly applicable to image compression processing other than JPEG compression processing.

INDUSTRIAL APPLICABILITY

As described above, according to the present invention, at the image processing apparatus, a plurality of items of image data read out in parallel are read-out and image-compressed by switching the plurality of image data in a designated order every time a predetermined number of blocks are read-out. In this way, a plurality of image data can be image-compressed using a single image compression processor and the scale of the circuit for carrying out image compression processing becoming large can be avoided. Further, it is not necessary for all image data that is not to be subjected to image compression processor within the plurality of image data to be stored in the image memory and a large capacity image memory is therefore not required. Moreover, during image compression processing, each of the plurality of image data passes through the image memory and is subjected to image compression processing at the image compression processor. The processing time required for the image compression processing can therefore be made short.

Further, according to the present invention, at the image processing apparatus, image-compressed image data is data where a plurality of image data read out in parallel are image-compressed every predetermined number of blocks and an identifier is inserted. In this way, a plurality of image data is separated from image-compressed image data in accordance with the identifiers. The time required for processing image-compressed image data can therefore be made shorter rather than expanding and then separating the data.

Further, according to the present invention, with this image processing method, a plurality of items of image data read out in parallel are read-out and image-compressed by switching the plurality of image data in a designated order every time a predetermined number of blocks are read-out, and identifiers are inserted. In this way, as described above, it is possible to image-compress a plurality of image data using a single image compression processor. It is therefore possible to store all image data within the plurality of image data that is not subjected to image compression processing stored in the image memory. It is therefore possible for each of a plurality of image data to be passed through the image memory and be subjected to image compression processing during image compression processing. Increases in circuit scale and image memory size in order to perform image compression processing can therefore be avoided. Moreover, a plurality of image data is separated from image-compressed image data in accordance with the identifiers. The time required for processing can therefore be made shorter by expanding and then separating the image-compressed image data.

The invention claimed is:

1. An image processing apparatus, comprising:
   a single image memory storing image data in a single image;
   a first image input unit having a first image reader which reads first image data, and writing the first image data into the single image according to a predetermined order, the first image data being an image of one of a front and rear surface of an original document;
   a second image input unit having a second image reader, which reads second image data in parallel with the first image reader, and is positioned spaced from the first image reader by a predetermined distance in a sub-scanning direction, and writing the second image data into the single image according to the predetermined order, the second image data being an image of the other of the front and rear surface of the original document;

an image read unit reading out the image data written into the single image for each block, and regarding the read image data as the first or second image data as a block row, each block having a predetermined size, a block row being made from a predetermined number of blocks arranged according to a main scanning direction; and an image compression unit carrying out compression processing on the first and second image data read out by the image read unit, wherein writing the first and second image data into the single image according to the predetermined order corresponding to the predetermined distance includes writing the first image data read prior to reading the second image data for a number of block rows corresponding to the predetermined distance, by the first image input unit, and then, writing alternately block rows of the first and second image data into the single image, by the first and second image input unit, and then, writing block rows of the second image data, for the number of block rows corresponding to the predetermined distance, into the single image, by the second image input unit, wherein the image read unit reads out the first and second image data written into the single image for each block, and regards the read image data as the first or second image data for each block according to predetermined order corresponding to the predetermined distance, and wherein the image compression unit carries out the compression processing for each block on the first and second image data read out by the image read unit, and then inserts an identifier after the final block of the predetermined number of blocks in a block row.

2. The image processing apparatus according to claim 1, wherein the image read unit starts reading out each of the first and second image data prior to storing all of the image data for each of the first and second image data in the single image memory.

3. The image processing apparatus according to claim 1, wherein the predetermined number of blocks can be changed, and a number of alternating block rows of the first and second image data in the predetermined order can be changed.

4. The image processing apparatus according to claim 1, wherein the image compression is JPEG compression, and the identifier is a restart marker thereof.

5. An image processing apparatus comprising:

an image processing control unit receiving an image file storing image-compressed image data which is a compressed data of image data, and an identifier separates the image-compressed image data; and an image expansion unit expanding the image-compressed image data, wherein the image data comprises first and second image data, the first image data being an image of one of a front and rear surface of an original document, being read by a first image reader provided in a first image input unit, and being written into the image file according to a predetermined order, the second image data being an image of the other of the front and rear surface of the original document, being read by a second image reader provided in a second image input unit, in parallel with reading the first image data, and the second image reader being positioned spaced from the first image reader by a predetermined distance in a sub-scanning direction, and the second image data being written into the image file according to the predetermined order wherein writing the first and second image data into the image file according to the predetermined order corresponding to the predetermined distance includes writing the first image data read prior to reading the second image data for a number of block rows corresponding to the predetermined distance, by the first image input unit, and then, writing alternately block rows of the first and second image data into the image file, by the first and second image input unit, and then, writing block rows of the second image data, for the number of block rows corresponding to the predetermined distance, into the image file, by the second image input unit, wherein the image-compressed image data includes blocks of the first and second image data which are read out from the image file according the predetermined order corresponding to the predetermined distance, and compressed, wherein the identifier is inserted after a final block of a predetermined number of blocks in a block row, all blocks in a block row representing the same one of the first and second image data, wherein the image processing control unit separates the image-compressed image data according to the identifiers included in the image-compressed image data to regard the separated image-compressed image data as the first and second image data according to the predetermined order corresponding to the predetermined distance, and sends the first and second image data to the image expansion unit, and wherein the image expansion unit expands each of the separated first and second image data for each block.

6. An image processing method comprising:

storing image data in a single image;

reading first image data by a first image reader provided in a first image input unit and writing the first image data which is an image of one of a front and rear surface of an original document, into the single image according to a predetermined order;

reading second image data in parallel with reading the first image data, by a second image reader provided in a second image input unit and positioned spaced from the first image reader by a predetermined distance in a sub-scanning direction, and writing the second image data which is an image of the other of the front and rear surface of the original document, into the single image according to the predetermined order;

reading out the image data written into the single image in blocks according to the predetermined order to regard the read image data as the first or second image data, each block having a predetermined size, each block row being made from a predetermined number of blocks of the same one of the first and second image data in corresponding to a main scanning direction;

carrying out compression processing on the first and second image data read out by the image read unit, inserting an identifier after a final block of a block row;

receiving an image file storing the image-compressed image data;

separating the image-compressed image data to the first and second image data according to the identifiers included in the image-compressed image data; and expanding each of the separated first and second image data for each block, wherein writing the first and second image data into the single image according to the predetermined order corresponding to the predetermined distance includes writing the first image data read prior to reading the second image data for a number of block rows corresponding to the predetermined distance by the first image input unit, and then, writing block rows of the first and second image data alternately into the single image by the first and second image input unit, and then, writing the second image data, for the number of block rows corresponding to the predetermined distance, into the single image, by the second image input unit, wherein the image read unit reads out the first and second image data for each block, and regards the read image data as the first or second image data for each block row according to the predetermined order corresponding to the predetermined distance, and wherein the image compression unit carries out the compression processing for each block on the first and second image data read out by the image read unit, and then inserts an identifier after a final block of each block row.

* * * * *

UNITED STATES PATENT AND TRADEMARK OFFICE
CERTIFICATE OF CORRECTION

PATENT NO. : 7,447,363 B2  
APPLICATION NO. : 10/511312  
DATED : November 4, 2008  
INVENTOR(S) : Tomoya Tanabe et al.

Page 1 of 1

It is certified that error appears in the above-identified patent and that said Letters Patent is hereby corrected as shown below:

Column 12, Line 21, after "according" insert --to--.

Signed and Sealed this

Twentieth Day of January, 2009

JON W. DUDAS  
*Director of the United States Patent and Trademark Office*